United States Patent
Jazzar

(10) Patent No.: US 9,512,825 B2
(45) Date of Patent: Dec. 6, 2016

(54) POWER GENERATING DOME

(71) Applicant: Mohammad Omar A. Jazzar, Clearwater, FL (US)

(72) Inventor: Mohammad Omar A. Jazzar, Clearwater, FL (US)

( * ) Notice: Subject to any disclaimer, the term of this patent is extended or adjusted under 35 U.S.C. 154(b) by 148 days.

(21) Appl. No.: 14/683,754

(22) Filed: Apr. 10, 2015

(65) Prior Publication Data
US 2016/0298611 A1    Oct. 13, 2016

(51) Int. Cl.
| F03D 9/00 | (2016.01) |
| F03G 6/04 | (2006.01) |
| F03G 6/00 | (2006.01) |
| F03G 6/06 | (2006.01) |

(52) U.S. Cl.
CPC ............... *F03G 6/003* (2013.01); *F03D 9/007* (2013.01); *F03G 6/065* (2013.01); *Y02E 10/465* (2013.01)

(58) Field of Classification Search
CPC ........ F03G 6/045; F03D 11/04; F03D 11/045; Y02E 10/465; Y02E 10/74
USPC ....... 60/641.12, 641.14; 290/44, 55; 52/80.1
See application file for complete search history.

(56) References Cited

U.S. PATENT DOCUMENTS

| 4,359,870 | A | * | 11/1982 | Holton, Sr. | ............. | F03G 6/045 |
| | | | | | | 60/641.12 |
| 4,945,693 | A | * | 8/1990 | Cooley | ................. | E04B 1/3211 |
| | | | | | | 290/55 |
| 5,284,628 | A | * | 2/1994 | Prueitt | ................... | B01D 47/06 |
| | | | | | | 261/116 |
| 5,300,817 | A | * | 4/1994 | Baird | ...................... | F03D 9/007 |
| | | | | | | 290/1 R |
| 7,147,438 | B2 | * | 12/2006 | DePaoli | ............... | F04D 29/362 |
| | | | | | | 416/3 |
| 8,269,368 | B2 | * | 9/2012 | White | ...................... | F03D 1/04 |
| | | | | | | 290/44 |
| 9,038,385 | B1 | * | 5/2015 | Khim | ...................... | F03D 9/007 |
| | | | | | | 60/641.12 |
| 2007/0245730 | A1 | * | 10/2007 | Mok | ........................ | F03D 1/04 |
| | | | | | | 60/641.8 |
| 2010/0275598 | A1 | * | 11/2010 | Raffaele | .................... | F02C 1/05 |
| | | | | | | 60/641.8 |
| 2011/0074164 | A1 | * | 3/2011 | Kobayashi | ............. | F03D 9/007 |
| | | | | | | 290/1 R |
| 2013/0015666 | A1 | | 1/2013 | Wilson | | |
| 2013/0257055 | A1 | * | 10/2013 | Simpson | .................... | F24J 3/08 |
| | | | | | | 290/52 |

FOREIGN PATENT DOCUMENTS

DE           10102675 A1 *   7/2002  ............... F03D 1/04

* cited by examiner

*Primary Examiner* — Thomas Denion
*Assistant Examiner* — Laert Dounis
(74) *Attorney, Agent, or Firm* — Larson & Larson, P.A.; Justin P. Miller; Patrick A. Reid

(57) ABSTRACT

The structure disclosed within creates shelter, insulating the contents or individuals inside from the elements, while also generating electrical power. The electrical power is generated using one or more methods, the methods being interchangeable and varying depending upon the location of the structure, the time of day, and the seasons.

14 Claims, 7 Drawing Sheets

POWER GENERATING DOME

FIELD

This invention relates to the field of structures and power generation and more particularly to a system that provides shelter while generating power.

BACKGROUND

The availability of energy remains an important issue, with its importance only growing as our demand for energy increases.

Many efforts to create sustainable sources of energy exist. For example, wind turbines, solar panels, and geothermal power plants. But frequently these methods require the creation of structures that serve no purpose other than supporting the energy generation equipment itself. Wind turbines require tall and expensive towers to raise the turbine above the ground. Solar panels require support structure, cleaning equipment, and potentially a tracking mechanism to follow the position of the sun. Geothermal energy requires a substantial facility to inject water, manage the resulting steam, and power turbines.

What is needed is a means of sustainably generating power while providing a useful structure.

SUMMARY

The Power Generating Dome provides a structure that creates shelter, insulating the contents or individuals inside from the elements, while also generating electrical power. The electrical power is generated using one or more methods, the methods being interchangeable and varying depending upon the location of the Power Generating Dome, the time of day, and the seasons.

The first and primary method of power generation is to harness the energy created by rising air. The rising air powers a turbine, and the turbine generates electricity.

The second method of power generation is an omni-directional horizontal wind turbine, powered by wind blowing past the Power Generating Dome.

The third method of power generation is a parabolic mirror used to turn water to steam.

Using Rising Air to Power the Turbine

Turning to the method of generating power using the rising air, the construction of the dome overall is discussed. The main structure of the dome is a series of curved joists. The joists can be metal, concrete, wood, or other materials. The joists are a solid cross-section, I-beam type, open web, or other suitable type and shape.

The illustrated embodiment uses open web steel joists.

Each joist follows an upward path, the combination of joists dividing the dome into sections, much like the sections of a beach ball. Each joist also has a thickness, measured from the inside of the dome structure to the outside. By affixing an inner membrane to the inside of the joists, and an outer membrane to the outside of the joists, an airspace is created. This airspace holds and channels the air that exists in the space between the inner and outer membrane, allowing the movement of this air to be harnessed for the purpose of generating electricity.

The movement of air through the airspace between the inner and outer membranes is caused by natural convection. Natural convection is the motion of fluids caused by differences in density, the differences in density caused by temperature.

The power-generating dome takes advantage of the means of generating power by harnessing the power of the rising air to spin a turbine.

A rising column of air is difficult to harness for use spinning a turbine. By creating a path for the flow of air from the base of the dome to the peak, the path of the air is controlled.

With the path controlled, the goal is to add as much heat to the air as possible. The addition of heat minimizes the density of air and increases the vapor pressure of the air. The increased vapor pressure causes the air to increase its volume and decrease its density. The decrease in density causes the air to rise.

As it rises, the air is channeled through the column to the top of the dome where it can escape to an area with lower pressure. The speed of flow of the air will increase as the air moves to an area with lower pressure, and therefore increasing the quantity of air that passes through the dome.

The dual-layer system acts to take in heat from the sun and transfers it to the air. In order to accomplish this each layer serves a different purpose.

The outer layer acts to allow the sun's heat to pass through, while preventing the air from leaking out. Appropriate materials can be flexible or rigid. Such materials include ABS plastic, acrylic, Kydex, Lexan, polycarbonate, polyethylene, polypropylene, PVC, and related materials.

The inner layer is one or more layers. The upper inner layer, exposed to the air within the channel, acts to absorb the energy of the sun and transfer the energy to the air. Ideally, the upper inner layer acts as a black body, absorbing all electromagnetic radiation. The absorbed radiation acts to increase the temperature of the inner layer, in turn heating the air, and increasing the rate of convection.

While this layer works best if it is heated, this heat is best kept away from the inside of the dome for two reasons: 1) any heat that is transmitted to the inside of the dome cannot be used to heat air in the channel, and thus does not help to produce electricity, and 2) the dome serves as a shelter and it is undesirable to have the dome heat up uncontrollably due to the sun.

To trap the heat in the channel, the lower inner layer is one or more insulating layers. The insulating layers can be many materials, such as reflective material to reduce the transmission of radiated heat. For example, a thin sheet of plastic coated with a metallic material, commonly known as a "space blanket." Additional layers may reduce the conduction of heat using other insulating materials, such as rock wool, polystyrene or urethane foam, natural wool, fiberglass, or other related materials.

Trapping the heat in the channel heats the air and decreases its density. With the lower density the air rises, exiting the dome at the entrance of the turbine.

The flow of air across the turbine blades causes the turbine to rotate, the turbine generating electricity. The structure of the turbine is discussed in more detail below.

The rising air is replaced in the channels of the dome by air taken in at inlets near the base of the dome. While the inlets can be located at ground level, in some locations it may be beneficial to raise the inlets off the ground to minimize the intake of dust and other surface-level contaminants.

The shape of the channels within the dome provides an additional advantage: as the air moves upward in the channels, the width of each channel narrows as it approaches the peak of the dome. For a given quantity of air to pass through a smaller cross-section, the velocity of the air must increase. The result is that a low velocity of air is drawn in at ground level, reducing the noise level and particulate intake, and a high velocity of air is discharged at the peak of the dome, increasing the rotational speed of the turbine.

Turning to the turbine itself, the turbine is of a unique construction. Commonly wind turbines, steam turbines, and so forth generate power by a fluid flow over the blades, this fluid turning a central shaft, the central shaft in turn rotating a generator, the generator creating electricity. This is mechanically complex and requires a large number of parts.

The turbine described within combines the parts of a generator and turbine into a single rotating piece by using magnets at the rotor tips. The rotor tip magnets rotate with respect to coils that surround the turbine, the resulting change in the magnetic field resulting in the creation of electricity.

Constructing the generator as disclosed within increases efficiency by avoiding the need for a geared transmission.

The blades with magnetic tips act as the armature of the generator. The blades pass near a stationary ring, which acts as the stator. The stator is located in close proximity to the blade tips to interact with the magnets to generate electricity. In a preferred embodiment, the stator is a circular shroud that surrounds the blades.

The turbine is supported by an extension of the structure of the dome.

The blades may constructed of any suitable material. Such materials include fiberglass or carbon fiber, as well as materials such as wood.

In certain weather conditions it may be useful to duct the warm air exiting the turbine exhaust into the dome interior. This warm air can act to both heat the dome interior and provide fresh air.

Generating Power Using Omni-Directional Horizontal Wind Turbine.

While power can be generated using solar energy during the day, another method of generating power is needed for night time, as well as cloudy periods.

Disclosed within is an omni-directional horizontal wind turbine. The wind turbine is mounted near the peak of the dome, with arms extending to cups affixed to the end of each arm. The arrangement is similar to that seen in cup anemometers. The result is that the wind turbine never needs to be turned to point into the wind. Rather, the cups operate with the wind coming from any direction.

The omni-directional horizontal wind turbine does not have a dedicated generator. Rather, the rotational motional of the wind turbine is optionally connected to the air turbine. This allows the energy of the wind to power the air turbine, reducing the number of required mechanical parts.

The omni-directional horizontal wind turbine is also able to have a very large working diameter, much larger than the more common wind turbines that are supported by a vertical stand. Because the omni-directional wind turbine is horizontal, increases in diameter never result in contact with the ground, and thus the diameter is limited only by structural strength and the proximity of other structures.

Generating Power Using a Parabolic Mirror to Turn Water to Steam.

Located at the top of the Power Generating Dome is a parabolic mirror used for steam generation. The parabolic mirror is made of multiple individual petals, each with a reflective coating. Above the parabolic mirror is a cluster of boilers, each holding a quantity of water. The boilers are attached to a rotating support. By rotation, individual boilers can be moved into place at the focal point of the parabolic mirror, causing the sun's energy to focus on that specific boiler.

The use of multiple, smaller boilers rather than a single, large boiler has multiple benefits.

First, less heat is required to boil the quantity of water present in a smaller boiler. This makes the boiler more useful on days with less than optimal sun exposure, and reduces the amount of time a given boiler needs to be in the sun before useful steam is produced. If clouds pass over the sun the short time required for steam generation may allow the boiler to still produce useful steam.

Second, the flexibility of multiple boilers allows for varying rates of steam generation. For example, if the sun is strong on a given day the boilers can be rapidly rotated into place, resulting in quick steam generation.

Third, the use of insulated boilers allows for steam storage. A given boiler can be heated, with the steam pressure building, and then rotated into a storage position. By storing the steam until later, such as during the night, power can be generated as needed, rather than only during the day.

The petals of the steam generator are able to rotate 180 degrees, closing off and protecting the steam generator, much like a closing flower. The shape of the steam generator also acts to collect rain water, which can be cleaned and used within the dome systems or for its occupants.

Additional Dome Support Systems

Given that the dome is intended for occupation, additional systems are present to maintain a habitable environment. Such systems include forced air temperature control systems, such as air conditioning systems and heating systems, as are known in the art.

Sensors may be installed on both the inside and outside of the dome to monitor the properties of the surrounding air. For example, temperature, humidity, and pressure. Additional sensors may monitor the weather in general. For example, time, intensity of sunlight, quantity of cloud cover, and so forth.

The external layers of the dome may include openings for natural light, commonly referred to as skylights. Such skylights may come in the form of windows, layers of the inner and outer membrane that are translucent or transparent, or passageways that transmit light along mirrored tubes.

Ports in the Power Generating Dome allow for the entrance and exit of air, preventing the build-up of stale air within the dome.

Power Storage

Often power needs to be stored for later use. The Power Generating Dome solves this problem through the use of a liquid battery, or flow battery. A flow battery consists of two liquids that are pumped past a membrane. Electrical current flows through the membrane and allows for charging/discharging of the battery.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
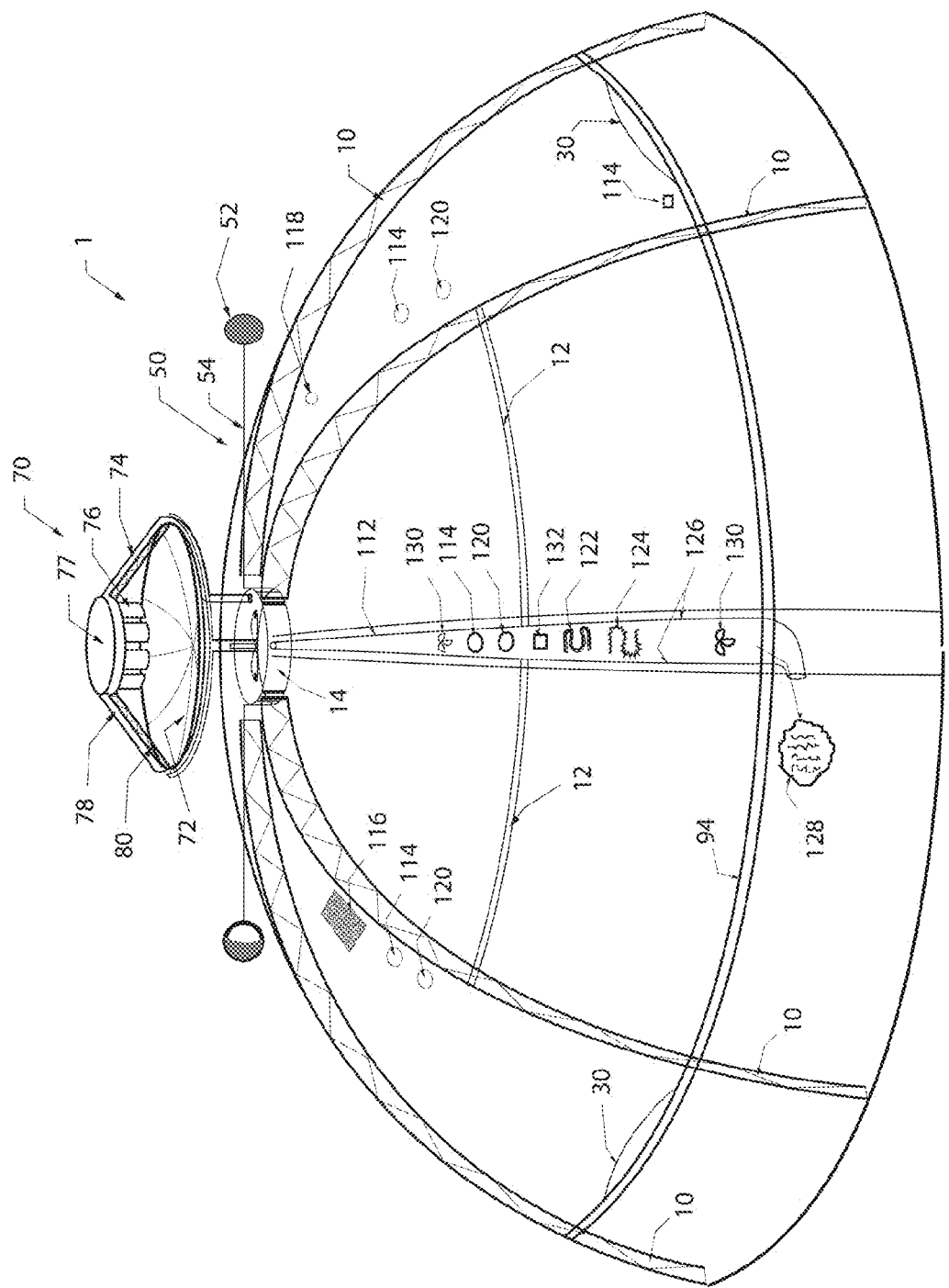
FIG. 1 illustrates an overall view of a first embodiment.

Reference will now be made in detail to the presently preferred embodiments of the invention, examples of which are illustrated in the accompanying drawings. Throughout the following detailed description, the same reference numerals refer to the same elements in all figures.

Referring to FIG. 1, an overall view of a first embodiment is shown.

The Power Generating Dome 1 is support by a structure created from joists 10, which are connected together by cross-supports 12. The joists 10 meet at a center support ring 14 at the peak of the dome. The center support ring 14 also supports the power generation equipment, which is described more thoroughly below.

As will be described more thoroughly below, air flow 140 enters the airspace 23 between the inner membranes 20 and outer membranes 24 at the air intakes 30, passing up the Power Generating Dome 1 and exiting at the turbine 40.

The omni-directional wind turbine 50 is shown, with the wind turbine cups 52 each attached via the wind turbine cup attachment spars 54.

Certain optional features may require penetrating the membranes of the Power Generating Dome 1. For example, the placement of sensors 114, or a skylight 116 to allow sunlight into the interior of the Power Generating Dome 1. In order to avoid a build-up of low quality air within the Power Generating Dome 1, optional features include a stale air exhaust 118 and a fresh air inlet 120.

The air flow 140 may be redirected downward through the recycle air duct 112, then conditioned, and finally introduced into the space inside the Power Generating Dome 1.

Shown in FIG. 1 are exemplary devices that may be used to condition the air. Exemplary devices include an A/C system 122 that creates cold air supply 128, a heating coil 124, or aerosol injector 132. The air is forced through the recycle air duct by one or more fans 130.

The recycle air duct 112 optionally includes insulation 126.

Figure 2A:
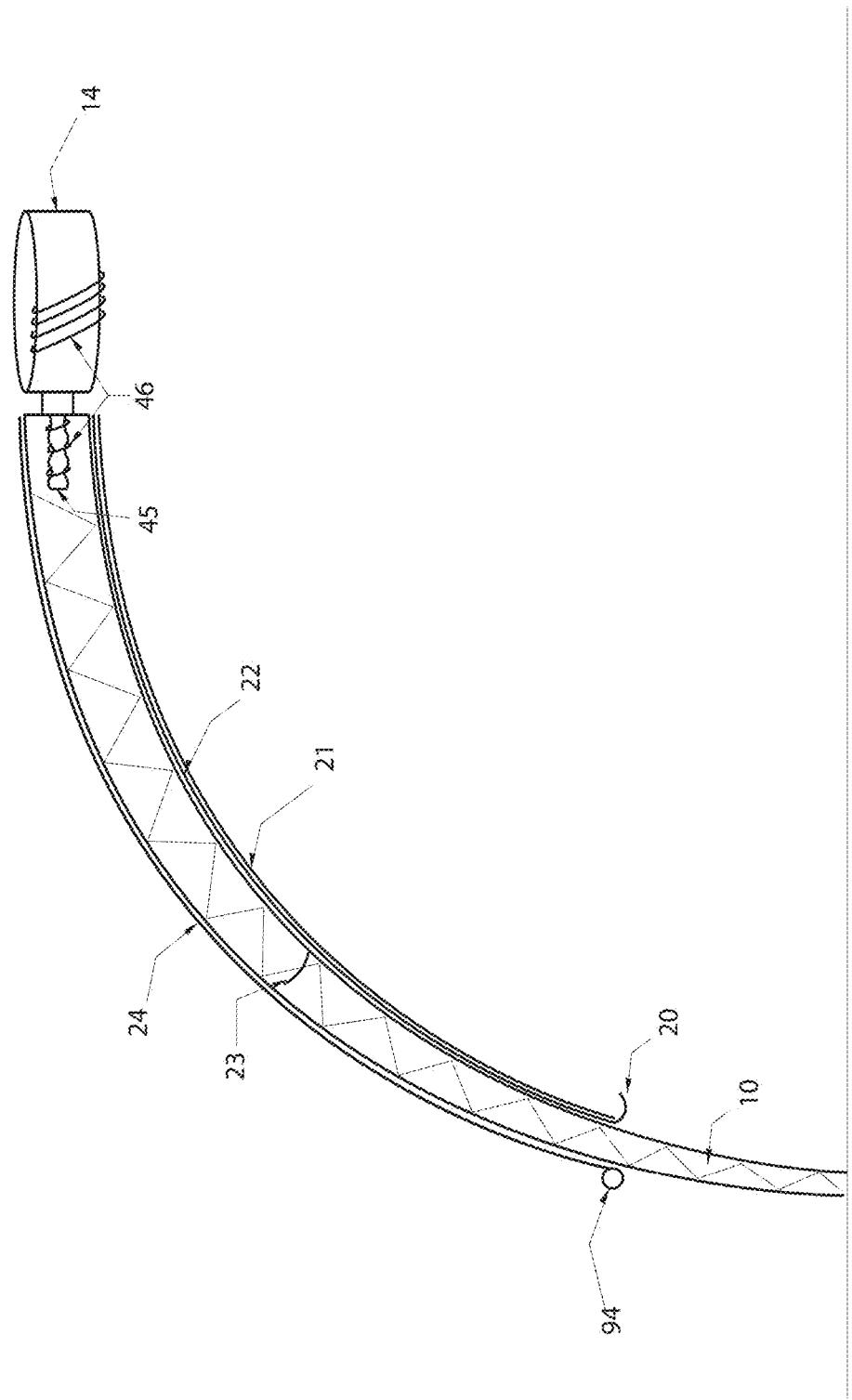
FIG. 2A illustrates a cutaway view the first embodiment, showing the support structure.

Referring to FIG. 2A, a cutaway view of the first embodiment and support structure is shown.

The joists 10 are again shown, meeting at the center support ring 14. The inside of the joists 10 is affixed to inner membranes 20. In some embodiments the inner membranes are made of an insulating inner membrane 21 and a heat absorbing inner membrane 22. The heat absorbing inner membrane 22 absorbs sunlight, heating the air within the airspace 23. The insulating inner membrane 21 prevents the absorbed heat from leaking into the interior of the Power Generating Dome 1.

The outside of the joists 10 is affixed to the outer membranes 24. In some embodiments the outer membranes 24 allow light and heat to enter the airspace 23, heating the captured air. In other embodiments the outer membrane 24 is an insulator, preventing heat from entering the airspace 23.

Also shown is the electrical generation coil 46 in two potential locations. The first is wrapped around the center support ring 14. The second is wrapped around an insulated cover 45, made of a material such as porcelain.

Figure 2B:
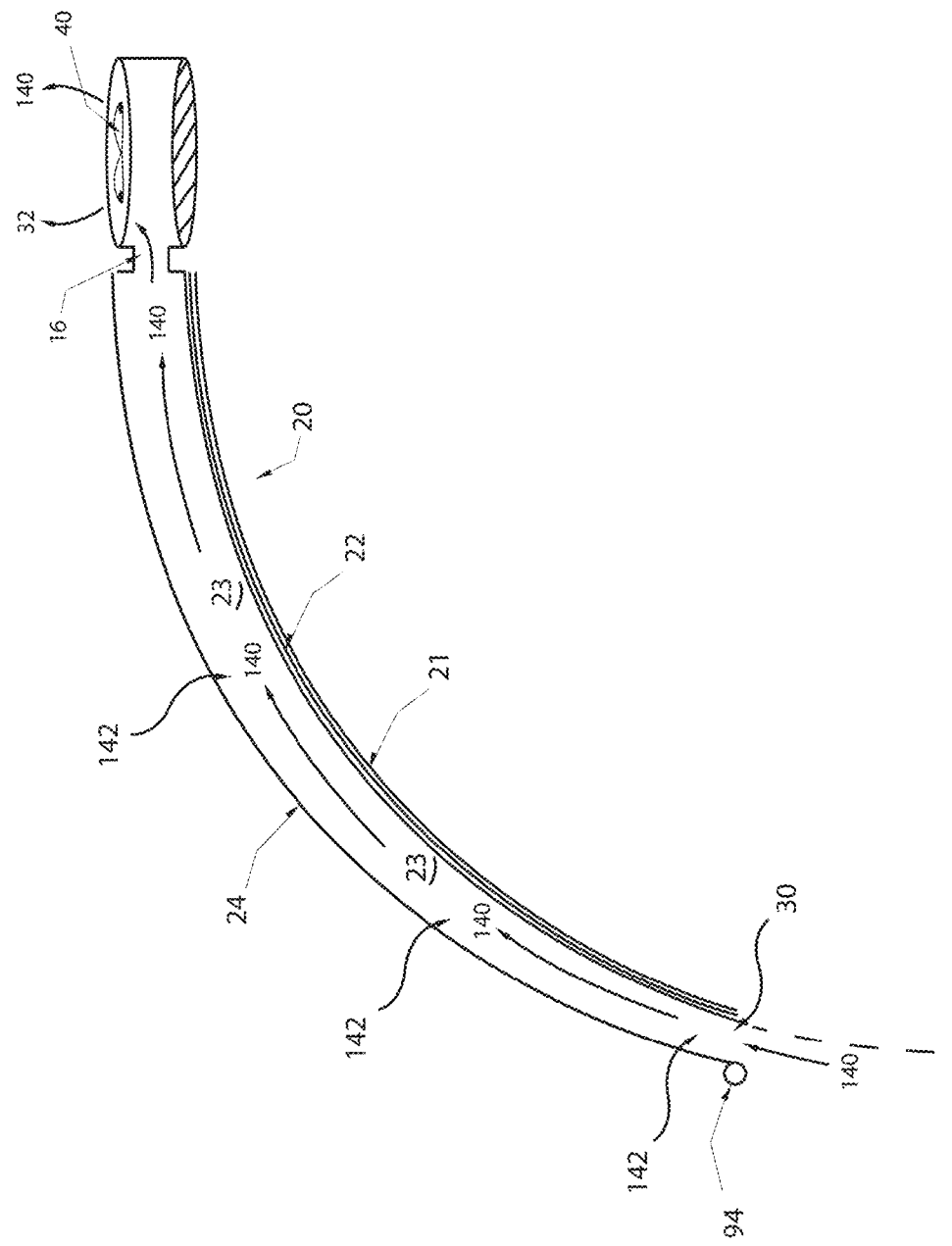
FIG. 2B illustrates a cutaway view the first embodiment, showing the path of airflow.

Referring to FIG. 2B, a cutaway view the first embodiment and the path of air flow 140 is shown.

The path of the air flow 140 is into the air intake 30, through the airspace 23—that is trapped between the inner membranes 20 and outer membranes 24, passing through the support ring penetration 16, spinning the turbine 40, and leaving the Power Generating Dome 1 at the air outlet 32.

The motive force behind the air flow 140 is sunlight 142. The sunlight 142 brings heat with it, adding energy to the air within the airspace 23, causing expansion and rising of the air, creating the airflow 140.

Figure 3:
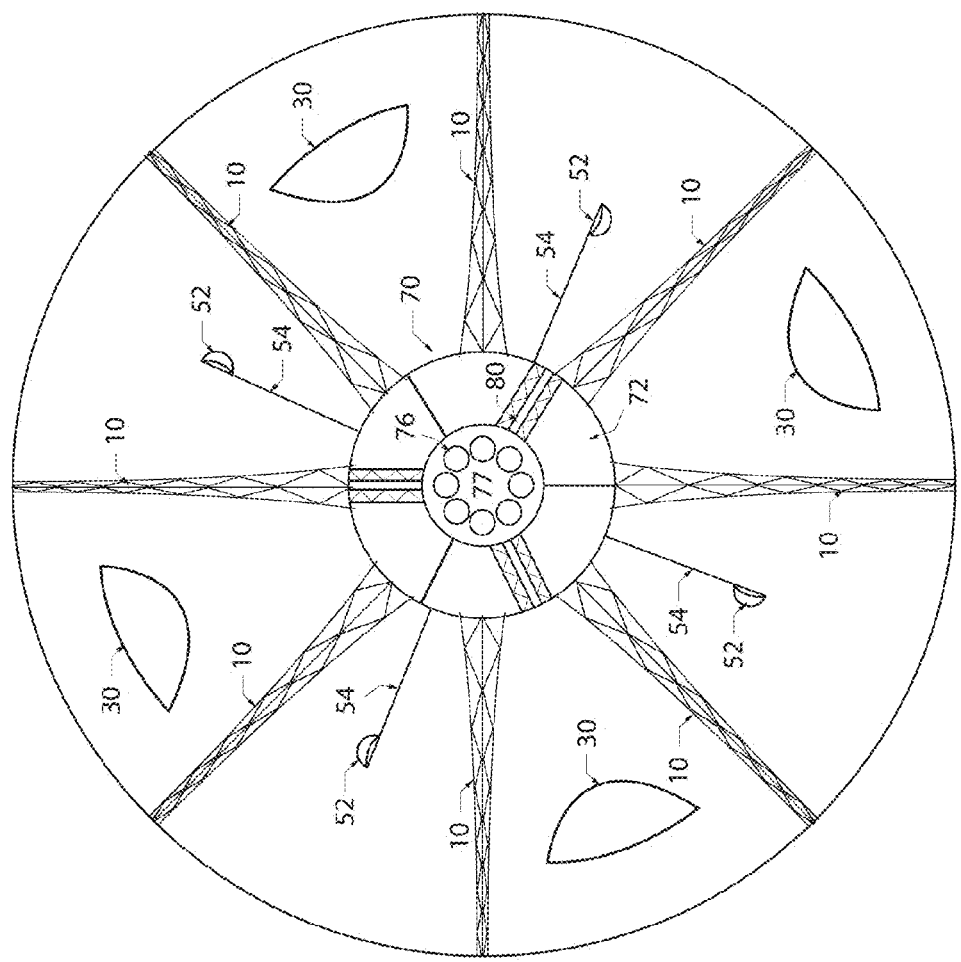
FIG. 3 illustrates an overhead view first embodiment.

Referring to FIG. 3, an overhead view first embodiment is shown.

From overhead, exemplary embodiments of the air intakes 30 are shown, although different shapes and locations are anticipated. The turbine 40 is not shown in this figure because it is hidden behind the steam generator 70.

The omni-directional wind turbine 50 is shown, with the wind turbine cups 52 each attached via the wind turbine cup attachment spars 54.

Also shown is the boiler cluster 76 with heat absorbent surface 77.

Figure 4:
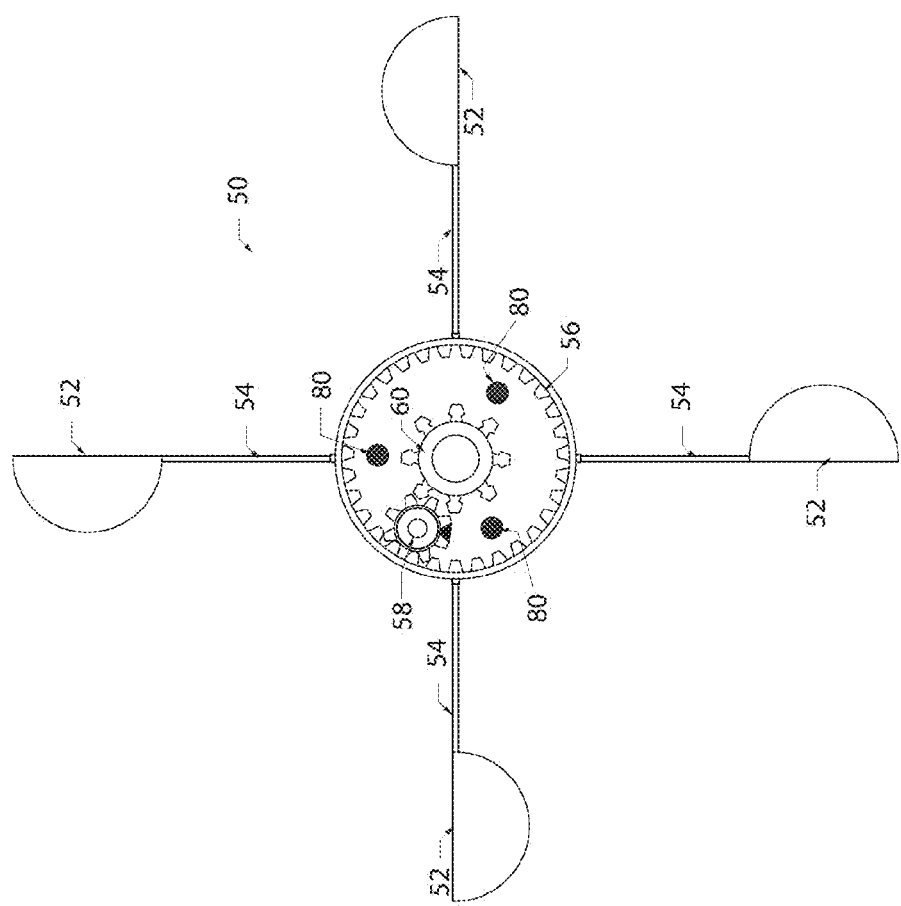
FIG. 4 illustrates a view of the gearing system that connects the wind turbine and gearing.

Referring to FIG. 4, a view of the gearing system that connects the wind turbine and gearing is shown.

As discussed above, the omni-directional wind turbine 50 uses wind turbine cups 52 each attached via the wind turbine cup attachment spars 54. The wind turbine cups 52 can be of any shape that allows for the omni-directional use of the omni-directional wind turbine 50. Such shapes generally have two sides: one side with a shape that allows the wind to pass over, and an opposite side that catches the wind. For the cup shape shown in FIG. 4, the uppermost wind turbine cup 52 is shaped such that wind coming from the left passes over the wind turbine cup 52, but wind coming from the right is caught by the wind turbine cup 52.

Given that the wind turbine 50 rotates, there is always a direction from which the wind catches the wind turbine cup 52, and thus the omni-directional wind turbine 50 is operational regardless of the direction of the wind.

An additional novel aspect of the Power Generating Dome 1 is the means by which the omni-directional wind turbine 50 creates electrical power.

Rather than having a separate generator, the omni-directional wind turbine 50 connects to the turbine 40 through a gearing system.

As shown in FIG. 4, the omni-directional wind turbine 50 includes an internally-toothed gear 56 connected to a central gear 60 by an engagement gear 58. The central gear 60 is connected to the turbine hub 43 (see FIG. 5).

The engagement gear 58 can be connected and disconnected as needed, only connecting the omni-directional wind turbine 50 to the turbine 40 when the power being generated by the wind is greater than that generated by the sun.

As a result of the gearing system that transmits the rotation of the omni-directional wind turbine 50 to the turbine hub 43, the rotational speed is multiplied many times over. The internally-toothed gear 56 is large with many teeth, and the central gear 60 is small with fewer teeth, resulting in a multiplication of rotational speed, increasing efficiency.

In alternative embodiments the connection between the omni-directional wind turbine 50 and turbine hub 43 is by means of a belt drive.

Also shown in FIG. 4 are the connection points for the boiler support structure 80.

Figure 5:
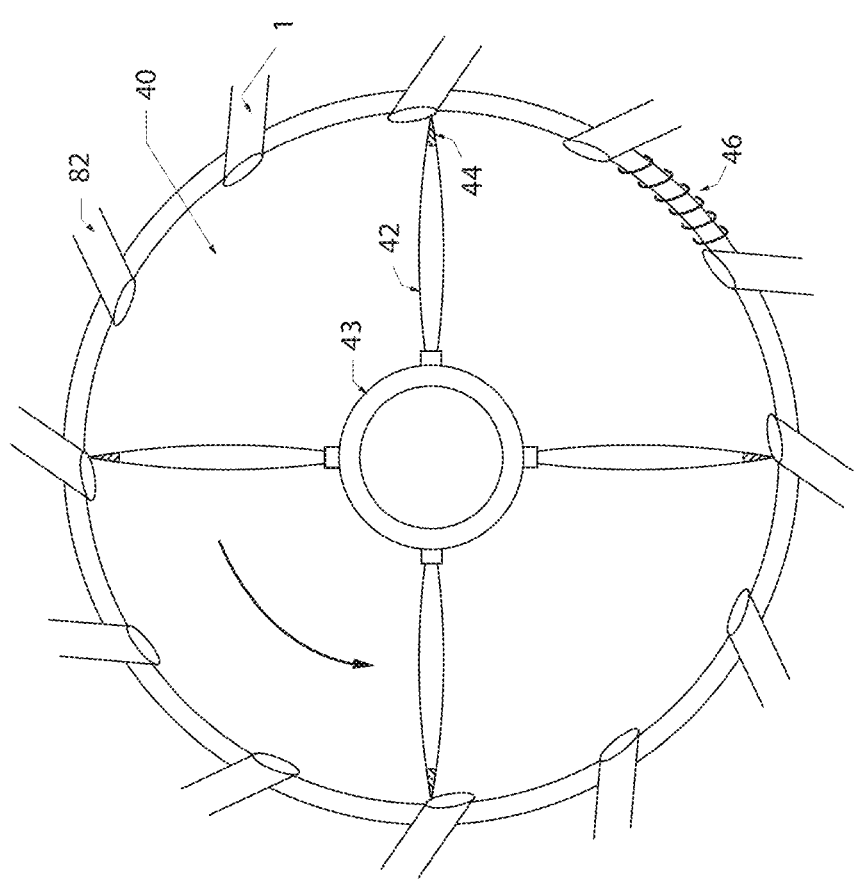
FIG. 5 illustrates the turbine and steam injection system.

Referring to FIG. 5, the turbine and steam injection system is shown. The turbine 40 spins around the turbine hub 43, the turbine blades 42 connected to the turbine hub 43. Each turbine blade 42 ends in a magnetic tip 44. As the magnetic tip 44 passes by the electrical generation coils 46 (only a single coil is shown in the figure), electrical current is generated.

The direction of rotation of the turbine 40 in this embodiment is shown by the arrow in the counter-clockwise rotation.

The steam produced by the steam generator 70 exits at the steam discharge ports 82, increasing the velocity of the turbine 40, and therefore increasing the power output of the turbine 40.

Figure 6:
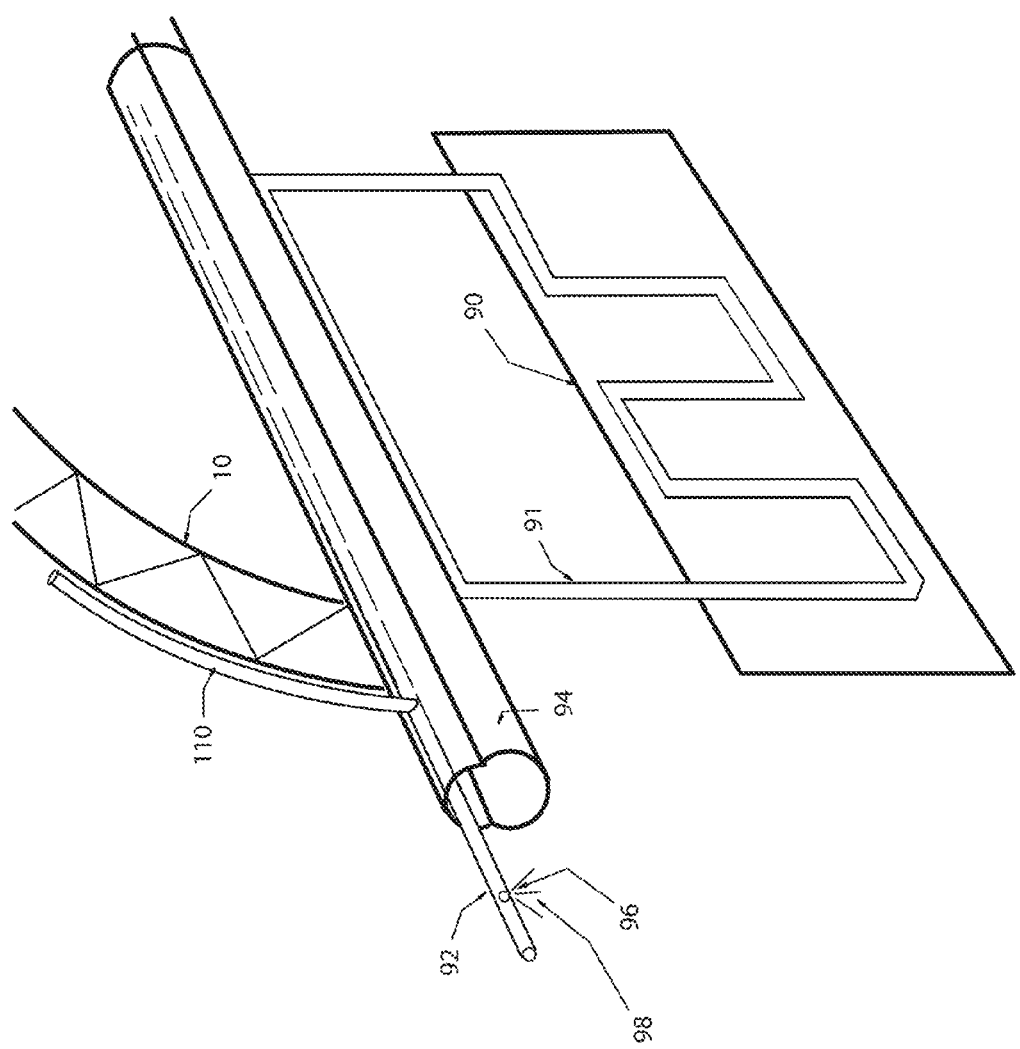
FIG. 6 illustrates a view of the water injection and cooling system of the first embodiment.

Referring to FIG. 6, a view of the water injection and cooling system of the first embodiment is shown. This system acts to cool the interior of the Power Generating Dome 1.

Water supply line 92 supplies water to the spray nozzles 96, which create water spray 98 within the collection tube 94. The evaporation of the sprayed water cools the water collection tubes 94, which in turn cool the tubing that makes up the cooling circuit 91. The tubing of the cooling circuit 91 passes through the cooling panel 90, allowing the liquid (not shown) within the cooling circuit to remove the heat from the cooling panel 90. The removed heat is transferred to the collection tube 94, thereby cooling the interior of the Power Generating Dome 1.

An exhaust tube 110 is included to provide a means of pressure reduction if needed.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A power-generating device in the shape of a dome, the power-generating device comprising:
   a. a support structure;
   b. a first layer forming an interior;
   c. a second layer forming an exterior; and
   d. a hot-air powered turbine used to generate electricity, the hot-air powered turbine located atop the support structure, the hot-air powered turbine comprising:
      i. a plurality of blades, one or more of the plurality of blades having a magnetic tip;
      ii. a hub to which the plurality of blades attaches;
      iii. a ring inside of which the hot-air powered turbine rotates; and
      iv. one or more electrical-generation coils affixed to the ring;
      v. whereby air heated by the sun rises between the first layer and the second layer, passes through the hot-air powered turbine, and the hot-air powered turbine rotates; and
      vi. whereby rotation of the hot-air powered turbine causes motion of the magnetic tips relative to the one or more electrical generation coils, producing electricity;
   e. a wind turbine including:
      i. a plurality of wind-catching cups;
      ii. a plurality of spars, each of the plurality of spars attached to one of the plurality of wind-catching cups; and
      iii. a rotatable hub, the plurality of spars attached to a rotatable hub;
      iv. whereby rotation of the wind turbine generates electricity;
   f. wherein the rotatable hub of the wind turbine directly mechanically connects to the hub of the hot-air powered turbine, allowing rotation of the wind turbine to generate electricity using the one or more magnetic tips of the hot-air powered turbine.

2. The power-generating device in the shape of a dome of claim 1, further comprising:
   a. a steam generation system comprising:
      i. a reflective surface to focus sunlight;
      ii. a plurality of boilers, the plurality of boilers forming a boiler cluster, the boiler cluster being rotatable to enable the reflective surface to focus on a single boiler of the boiler cluster;
      iii. a boiler water supply line connected to the boiler cluster; and
      iv. a steam discharge line connected to the boiler cluster;
   b. whereby the steam generation system uses the heat of the sun to boil water contained within the boiler cluster, the resulting steam used to generate electricity.

3. The power-generating device in the shape of a dome of claim 2, wherein the steam generated by the boiler cluster is used to increase the rotational speed of the hot-air powered turbine and as a result generate additional electricity.

4. The power-generating device in the shape of a dome of claim 1, further comprising:
   a. an air duct, the air duct taking in air at the exhaust of the hot-air powered turbine, conditioning the air, and finally routing the air into the dome.

5. A power generation and shelter system for creating power using rising air heated by the sun comprising:
   a. a support structure;
   b. an inner layer;
   c. an outer layer;
   d. the inner layer separated from and connected to the outer layer by the support structure, creating an airspace;
   e. the airspace allowing for a flow of air between the inner layer and the outer layer, the flow of air spinning a power-generating turbine
   f. the power-generating turbine including:
      i. a plurality of blades, one or more of the plurality of blades having a magnetic tip;
      ii. a first hub to which the plurality of blades attaches;
      iii. a ring inside of which the turbine rotates;
      iv. one or more electrical-generation coils affixed to the ring;
      v. whereby rotation of the power-generating turbine causes motion of the magnetic tips relative to the one or more electrical generation coils, producing electricity;
   g. a wind turbine comprising:
      i. a plurality of wind-catching cups;
      ii. a plurality of spars, each of the plurality of spars attached to one of the plurality of wind-catching cups; and
      iii. a second hub, the plurality of spars attached to the second hub;
      iv. the second hub mechanically connected to the first hub by one or more gears, whereby rotation of the second hub by the wind-catching cups causes rotation of the first hub, thereby producing electricity.

6. The power generation and shelter system for creating power using rising air heated by the sun of claim 5 wherein:
   a. the inner layer is a material that acts substantially as a black body to absorb solar energy and increases in temperature, thereby heating the air contained within the channel; and
   b. the outer layer is a material substantially impermeable to air and substantially transparent to light.

7. The power generation and shelter system for creating power using rising air heated by the sun of claim 5, wherein the second hub connects to the first hub, allowing rotation of the wind turbine to generate electricity using the one or more magnetic tips.

8. The power generation and shelter system for creating power using rising air heated by the sun of claim 5, further comprising:
   a. a steam generation system comprising:
      i. reflective surfaces shaped like petals of a flower, the reflective surfaces used to focus sunlight;
      ii. a plurality of boilers, the plurality of boilers forming a boiler cluster, the boiler cluster being rotatable to enable the reflective surfaces to focus on a single boiler of the boiler cluster;
      iii. a boiler water supply line connected to the boiler cluster; and
      iv. a steam discharge line connected to the boiler cluster;
   b. whereby the steam generation system uses the heat of the sun to boil water contained within the boiler cluster, the resulting steam used to generate electricity.

9. The power generation and shelter system for creating power using rising air heated by the sun of claim 8, wherein the steam generated by the boiler cluster is used to increase the rotational speed of the power-generating turbine and as a result generate additional electricity.

10. The power generation and shelter system for creating power using rising air heated by the sun of claim 5, further comprising:
    a. an air duct, the air duct taking in air at the exhaust of the power-generating turbine, conditioning the air, and finally routing the air into the interior.

11. A power-generating dome having a peak and a base, the power-generating dome comprising:
    a. a support structure in the shape of a dome, the support structure creating an inner surface and an outer surface;
    b. an inner membrane affixed to the inner surface;
    c. an outer membrane affixed to the outer surface, the space between the inner membrane and the outer membrane acting as a channel to allow air from the base to the peak;
    d. one or more penetrations near the base of the power-generating dome, the one or more penetrations allowing air to flow into the channels; and
    e. a power-generating turbine located at the peak of the power-generating dome, air flow from the channels routed to pass through the power-generating turbine;
       i. the power-generating turbine including one or more blades with a magnetic tip;
    f. a wind turbine comprising:
       i. a plurality of wind-catching cups;
       ii. a plurality of spars, each of the plurality of spars attached to one of the plurality of wind-catching cups; and
       iii. a rotatable hub, the plurality of spars attached to the rotatable hub;
    g. whereby power may be generated by either the sun's energy heating the air contained in the channels, causing the air to expand and rise, the rising air flowing through the power-generating turbine, or by wind energy rotating the wind turbine, being that either motion of the power-generating turbine or motion of the wind turbine causes generation of power by virtue of a direct connection between the power-generating turbine and the wind turbine.

12. The power-generating dome having a peak and a base of claim 11, further comprising:
    a. a water collection system comprising:
       i. a water supply line;
       ii. a collection tube; and
       iii. one or more spray nozzles that discharge into the collection tube;
    b. a cooling circuit comprising:
       i. a cooling panel;
       ii. a circulating liquid; and
       iii. tubing, the tubing connected to the cooling panel and collection tube;
    c. whereby operation of the spray nozzles cools the collection tube, cooling the circulating liquid, which removes heat from the cooling panel, thereby cooling the interior of the power-generating dome.

13. The power-generating dome having a peak and a base of claim 11, wherein the inner membrane is a material that acts substantially as a black body to absorb solar energy and increases in temperature, thereby heating the air contained within the channel.

14. The power-generating dome having a peak and a base of claim 11, wherein the outer membrane is a material substantially impermeable to air and substantially transparent to light.

* * * * *